US009880823B1

(12) United States Patent
Barnea et al.

(10) Patent No.: US 9,880,823 B1
(45) Date of Patent: Jan. 30, 2018

(54) METHOD FOR TRANSLATING MULTI MODAL EXECUTION DEPENDENCY GRAPH WITH DATA INTERDEPENDENCIES TO EFFICIENT APPLICATION ON HOMOGENOUS BIG DATA PROCESSING PLATFORM

(71) Applicant: International Business Machines Corporation, Armonk, NY (US)

(72) Inventors: Oren Barnea, Haifa (IL); Flora Gilboa-Solomon, Haifa (IL); Simona Rabinovici-Cohen, Haifa (IL); Eugene Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/264,597

(22) Filed: Sep. 14, 2016

(51) Int. Cl.
*G06F 9/44* (2006.01)
*G06F 9/45* (2006.01)

(52) U.S. Cl.
CPC . *G06F 8/51* (2013.01); *G06F 8/70* (2013.01)

(58) Field of Classification Search
None
See application file for complete search history.

(56) References Cited

U.S. PATENT DOCUMENTS

| 7,689,582 | B2 * | 3/2010 | Behnen | G06F 8/30 |
| | | | | 707/999.102 |
| 9,235,446 | B2 * | 1/2016 | Bruno | G06F 9/5066 |
| 9,424,112 | B1 * | 8/2016 | Malamut | G06F 9/547 |
| 2003/0135621 | A1 | 7/2003 | Romagnoli | |
| 2012/0324449 | A1 | 12/2012 | Huetter et al. | |
| 2015/0331724 | A1 | 11/2015 | Sahu | |
| 2017/0039239 | A1 * | 2/2017 | Saadat-Panah | G06F 17/30463 |

OTHER PUBLICATIONS

Yingyi Su et al,, "Scaling Datalog for Machine Learning on Big Data", (Submitted on Mar. 1, 2012 (v1), last revised Mar. 2, 2012 (this version, v2)), Journal Article, Come University Library.
Divy Agrawal et al., "Road to Freedom in Big Data Analytics", In EDBT 2016, pp. 479-484, 2016. Can be found at: https://openproceedings.org/2016/conf/edbt/paper-111.pdf.
Kenney Ng et al., "PARAMO: A PARAllel predictive MOdeling platform for healthcare analytic research using electronic health records", Journal of Biomedical Informatics, vol. 48, Apr. 2014, pp. 160-170.

* cited by examiner

*Primary Examiner* — Qamrun Nahar (57) ABSTRACT

This invention relates to a method and system for creating applications that can be executed on homogeneous big data platforms. The applications can be executed on a particular platform, such as SAPRK or UIMA-AS, but the method and system are able to translate the input to these targeted platforms without the developer needing to tailor the application specifically to the platform. The method and system are based on the use of an execution dependency graph and a cluster configuration. The execution dependency graph can include interdependencies in the data. Furthermore, the system optimizes for different analytics modules that have varying execution times. The output of the method is an application suitable for the target big data platform.

20 Claims, 8 Drawing Sheets

FIG. 1

```
{"MedSievePipeline":
  [{"pipelineID": "13ff24a0-4885-11e4-9de2-0002a5d5c523",
    "pipelineName": "MGCalcification",
    "templateType": "ImagingStudy",
    "pipelineResult":"D",
    "preferredEngine": ["SPARK"],
    "analytics":
    [{"name":"A",
      "locationInTemplate":{"object": "series", "number": 0},
      "dependOn":[],
      "nodeType": {"minimumMemory": 0, "estimatedExecutionTimeOnCPU": 10,
"estimatedExecutionTimeOnGPU": 10, "GPUModel": "", "CPUType": ""},
      "inputParams":{"saveExplanation":0}
    },
    {"name":"B",
      "locationInTemplate":{"object": "series", "number": 0},
      "dependOn":["A"],
      "nodeType": {"minimumMemory": 0, "estimatedExecutionTimeOnCPU": 20,
"estimatedExecutionTimeOnGPU": 20, "GPUModel": "", "CPUType": ""},
      "inputParams":{"modelURI":"@path(MGReportGeneration/MG_semantic_model.mat)"}
    },
    {"name":"C",
      "locationInTemplate":{"object": "series", "number": 1},
      "dependOn":["A"],
      "nodeType": {"minimumMemory": 0, "estimatedExecutionTimeOnCPU": 20,
"estimatedExecutionTimeOnGPU": 20, "GPUModel": "", "CPUType": ""},
      "inputParams":{"modelURI":"@path(MGReportGeneration/MG_semantic_model.mat)"}
    },
    {"name":"D",
      "locationInTemplate":{"object": "study"},
      "dependOn":["B, C"],
      "nodeType": {"minimumMemory": 0, "estimatedExecutionTimeOnCPU": 5,
"estimatedExecutionTimeOnGPU": 5, "GPUModel": "", "CPUType": ""},
      "inputParams":{"saveExplanation":1}
    }
    ]
  }
  ]
}
```

METHOD FOR TRANSLATING MULTI MODAL EXECUTION DEPENDENCY GRAPH WITH DATA INTERDEPENDENCIES TO EFFICIENT APPLICATION ON HOMOGENOUS BIG DATA PROCESSING PLATFORM

FIELD OF TECHNOLOGY

The present invention relates to the development of cluster applications. In particular, the present invention relates to using an execution dependency graph to construct a big data application on a homogeneous platform.

BACKGROUND OF THE INVENTION

Big data processing platforms, operating on a cluster of computing nodes, are becoming increasingly popular as a tool for solving analytics-related challenges. However, these platforms generally require learning the specific platform architecture and writing specific code for that platform when developing a big data application. For example, the Apache SPARK and Unstructured Information Management Architecture Asynchronous Scaleout (UIMA-AS) are popular platforms for big data analytics with a large, growing ecosystems. SPARK, in particular, provides a scalable, fault-tolerant, distributed backend for analyzing large datasets in a scale-out cluster. However, SPARK is oriented towards analyzing text, has no built-in support for Matlab or legacy code, and requires learning the platform architecture and APIs to write specific code for that environment.

In conventional approaches to big data processing, multimodal analytic developers have to learn and specifically develop for each particular platform. These platforms, including the open source Apache SPARK and Unstructured Information Management Architecture Asynchronous Scaleout (UIMA-AS), each provide their own interface. The recent big data processing platforms, such as SPARK, have a more flexible programming model than earlier platforms, such as Hadoop, and this flexibility provides a new power in the "application space" to create optimized applications. This means that applications in SPARK can actually rewrite the way data is partitioned, shuffled, or aggregated, which is not necessarily possible in Hadoop MapReduce. However, significant challenges remain in adapting to these flexible programming models.

What is needed is a system and method to provide multi modal analytics developers and users to seamlessly use big data processing platforms such as SPARK or UIMA-AS without the need to learn their architecture and API.

SUMMARY OF INVENTION

This summary is provided with the understanding that it will not be used to limit the scope or meaning of the claims.

The present invention, in an embodiment, relates to providing a method for reducing the development effort for creating big data applications. By creating an application development architecture that can address homogeneous big data processing platforms, the developer can avoid tailoring a solution for any particular processing platform. This can reduce development time and improve the maintainability of the application.

The invention, in an embodiment, further relates to parallel computing. While some aspects relate to parallelizing compilers, which extract parallelism from sequential code, or special-purpose parallel programming languages, the invention, in an embodiment, is able to improve parallelism by partitioning the operating steps and optimizing the data interdependencies across the cluster.

The invention, in an aspect, allows developers to specify computation and communication patterns in a way that can be translated to multiple big data platforms and is independent of the target architecture. This model conveniently creates concurrency in the big data application, and the target platform runtime system manages the execution of the parallel computations on the cluster. The invention, in an embodiment, can generate optimal or near-optimal concurrency in computation and communication tasks in the application to reduce makespan.

In a further aspect, the invention relates to a method for big data processing comprising creating a parallel ordering, defining a threshold, creating an execution plan by adding control steps to either topological ordering (if number of keys in data is greater than threshold) or parallel ordering (if number of keys is smaller or equals the threshold), creating data partitions plan for each one of the control steps taking in account the estimated execution time, data size, cluster configuration and reshuffle cost, and translating the execution plan and the data partitions plan to an application in the specific big data processing platform.

Numerous other embodiments are described throughout herein. All of these embodiments are intended to be within the scope of the invention herein disclosed. Although various embodiments are described herein, it is to be understood that not necessarily all objects, advantages, features or concepts need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

The methods and systems disclosed herein may be implemented in any means for achieving various aspects, and may be executed in a form of a machine-readable medium embodying a set of instructions that, when executed by a machine, cause the machine to perform any of the operations disclosed herein. These and other features, aspects, and advantages of the present invention will become readily apparent to those skilled in the art and understood with reference to the following description, appended claims, and accompanying figures, the invention not being limited to any particular disclosed embodiment(s).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical and structural changes may be made to the embodiments without departing from the spirit and scope of the present teachings. The following detailed description is therefore not to be taken in a limiting sense, and the scope of the present disclosure is defined by the appended claims and their equivalents.

Figure 1:
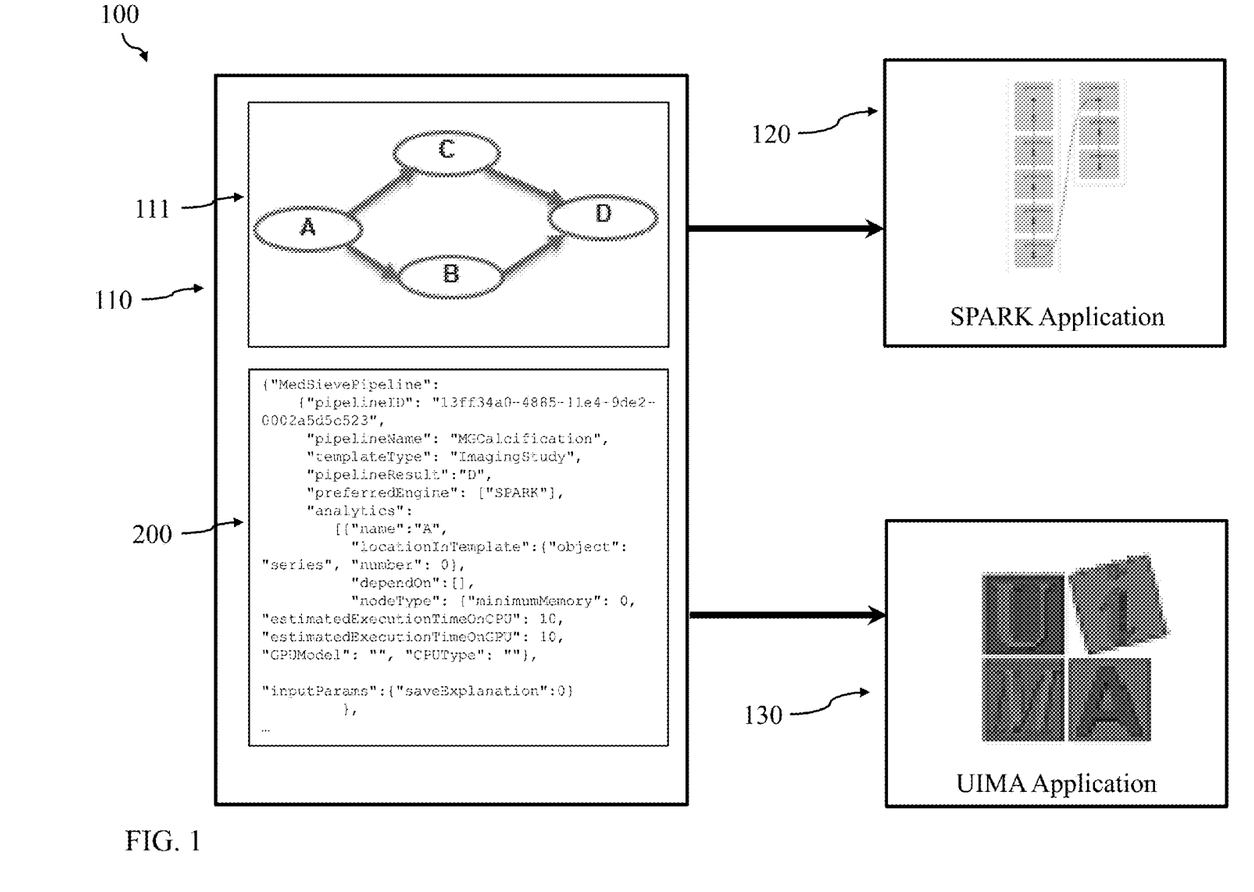
FIG. 1 illustrates a process of the invention, according to an embodiment of the present invention.

FIG. 1 illustrates the overall process of the system, according to an embodiment. The data contains interdependencies, and different analytics modules may require different granularities in the data. The analytics user/developer only needs to specify the analytics involved in the pipeline, the granularity of the data it analyzes for each analytics, and the dependencies on other analytics. This information is captured in a graph referred to as an Execution Dependency DAG. On the right of FIG. 1 are two big data applications, a SPARK application 120 and a UIMA application 130. The big data application platforms include, but are not limited to SPARK and UIMA.

The high level process 100 depicted in FIG. 1 shows how the system 10 operates. The system 110 receives an execution dependency graph 111. In this example execution dependency graph 111, module B and module C depend on the results of module A. Module D depends on the results of both module B and module C. The execution dependency graph has an associated textual description 200, which is referred to as the pipeline descriptor.

Figure 2:
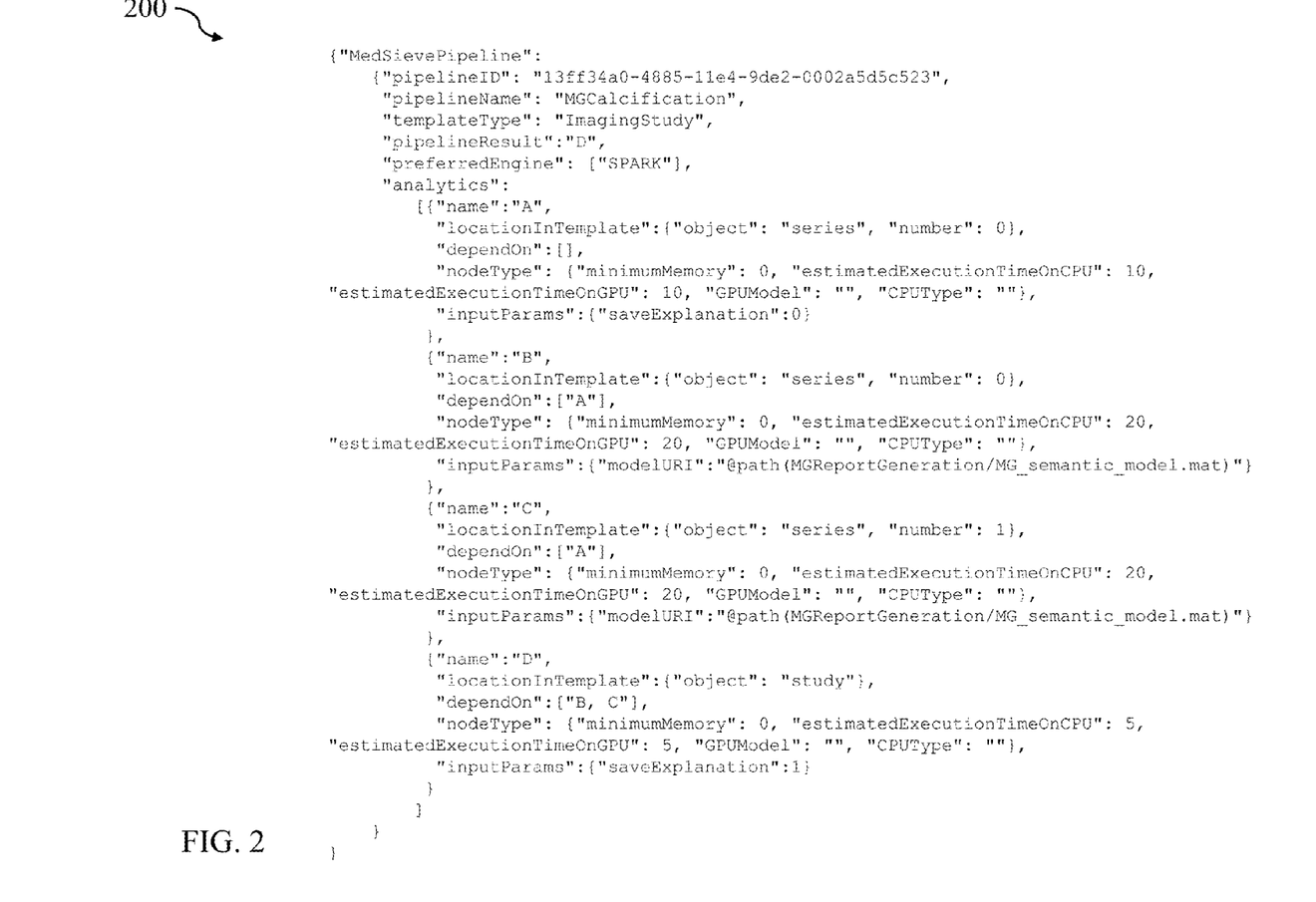
FIG. 2 shows a pipeline descriptor, according to an embodiment of present invention.

FIG. 2 shows an example of a pipeline descriptor 200, according to an embodiment of present invention. The pipeline descriptor 200 contains a number of parameters defining, among others, the pipelineID, the pipelineName, the templateType, the pipelineResult, and the preferredEngine. The analytics block of the pipeline descriptor 200 includes parameters such as locationInTemplate and the estimated execution time of each one of the analytics module. The total execution time can be extracted from these values by summing those in the path.

The system 100 automatically translates from the pipeline descriptor 200 to the big data applications 120, 130 while the resulting applications 120, 130 are correct and efficient. More precisely, given a description of the execution dependency graph 111, namely the pipeline descriptor 200, the system 100 is able to provide automatic translation from the pipeline descriptor 200 to an efficient big data platform application 120, 130. The resulted application 120, 130 is efficient in the sense that it minimizes the makespan (the time from the beginning of the first task until the completion of the final task). Some big data platforms, such as SPARK in certain configurations (static partition), do not release the application assigned resources until the last task has ended. Thus, minimizing the makespan creates efficient application that finishes the job as fast as possible and also helps in releasing the platform resources earlier.

In order for the application to be efficient in a homogenous cluster, the cluster machines need to work as often as possible. In addition, the data transfers need to be minimized. However, data transfers are typically less important if one assumes that the analytics modules are mostly compute-intensive. Thus, when there is a lot of data to process, topological ordering is used, as this ordering causes all the cluster machines to work at all times with no data transfers (reshuffling). On the other hand, when the data is small, parallel ordering is used to maximize the task partition and thus minimize the idle time of cluster machines. This combined approach in turn minimizes the makespan.

The data, in an embodiment of the present invention, comprises data items with a unique key identifier (key_id) for each item. Data items are also associated with a case identifier (case_id) and related data items have the same case_id. A data item with a particular case_id can be processed independently of those data items not having that particular case_id. But, data items within the same case_id may be dependent and processed together by some of the analytics modules. As mentioned, some modules in the DAG may work on independent data items while others on cases; different modules work on different granularity.

For example, assume the data items are patches of an image. Then, each patch has a unique key_id and all the patches of the same image have the same case_id. Some of the analytics modules in the DAG work on the granularity of patches and some analytics modules work on the granularity of full images. Analytics modules that work on different granularity of the data are supported in the model. The user specifies the granularity of analytics modules in the pipeline descriptor 200. In our example, for each analytics module the user specifies in the pipeline descriptor 200 whether it works on patches which are independent data items or on the whole case namely the whole image and jointly analyzing all data items (patches) within the same case_id (image).

Each level in the ordering list is called an analytics step. In addition, several control steps that manage the division of data into partitions for distribution to the various nodes of the cluster are defined. These controls steps include the produce (P) control step, the divide (D) control step, the merge (M) control step, the remerge (R) control step, and the collect (C) control step. The produce control step produces partitions out of the data sources. Each partition includes [set of keys, module] namely the data items and analytics module to execute on that set of data items. The divide control step divides the partitions into another set of partitions where the same key_id may appear in multiple partitions but with different modules. The merge control step merges the partitions such that each key_id appears in one partition only but the same case_id can be in different partitions. The remerge control step merges the partitions such that each case_id appears in one partition only. Finally, the collect control step collects the partitions into one output data. The control steps can cause reshuffling of data namely that data is moved between the nodes of the cluster, which may incur an additional cost. The approach described consists of a two-level hierarchy, namely key_id and case_id.

The approach can be easily extended to additional levels by adding additional identifiers beyond key_id and case_id, and respective control steps.

The system allows the analytics developer/user simply define what modules work on independent data items, what modules work on cases, and what modules work on higher levels in the hierarchy of data interdependencies. The system automatically creates the efficient big data analytics application that partitions and repartitions the data and modules to machines in the homogeneous cluster while satisfying this model with interdependences.

Figure 8:
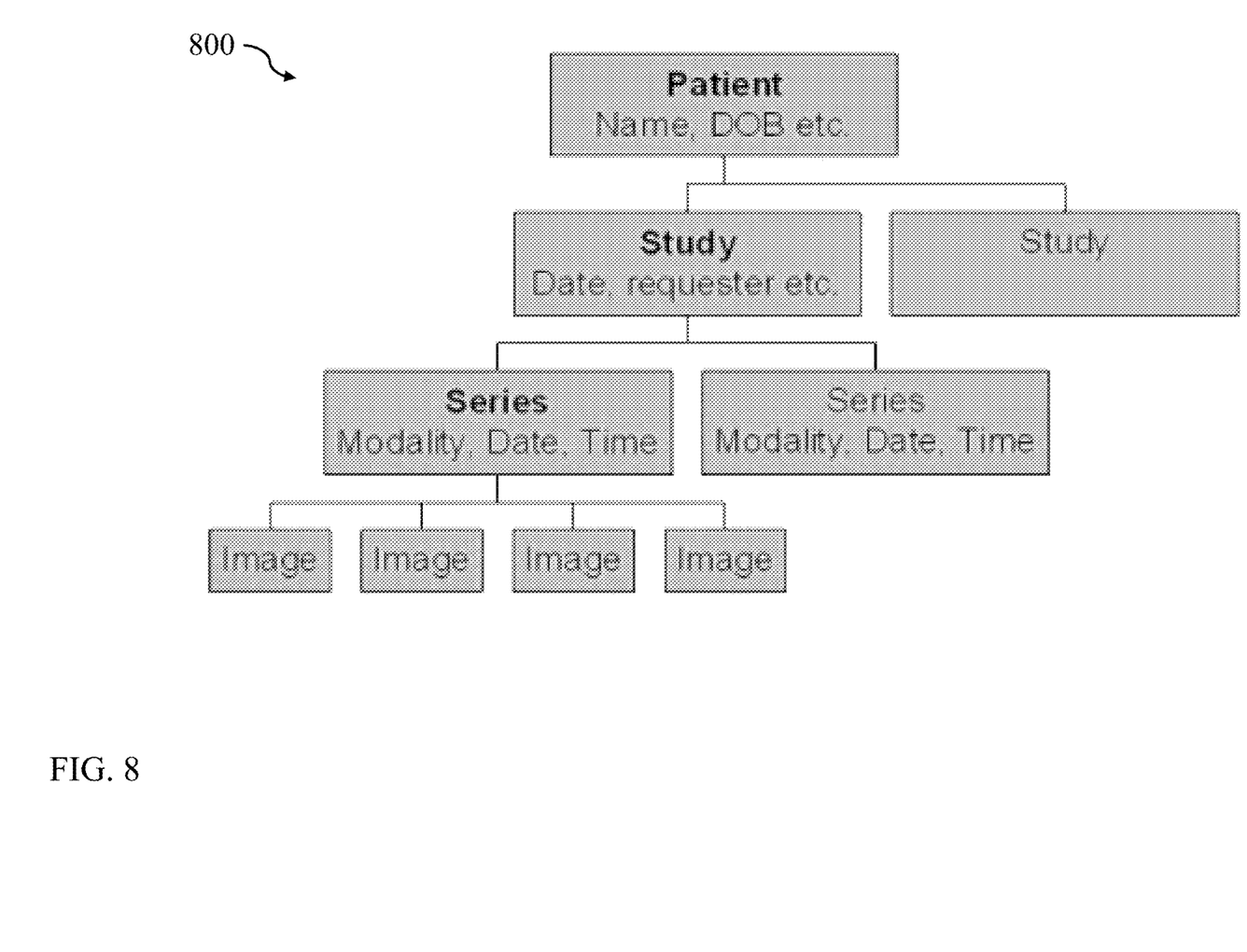
FIG. 8 shows a model hierarchy, according to an embodiment of the present invention.

While described herein is a model that included a hierarchy of 2 levels, key_id and case_id, this model can be extended to a hierarchy of any number of levels. The process to create the efficient big data analytics application can be extended to accommodate any number of levels in the hierarchy. For example, in the medical imaging domain, the model includes patients, each patient has studies, each study includes series, and each series includes images. This model hierarchy 800 of an embodiment is shown in FIG. 8. Further, some of the analytics work on images, some on studies, some on series, and some on images. In FIG. 8, the model 800 has 4 levels of hierarchy of data interdependencies. For the medical Imaging domain, supporting different granularity is shown in the pipeline descriptor in FIG. 2, in the field "locationInTemplate". The locationInTemplate for analytics A is set to series and for analytics D is set to study. This represents different granularity for different analytics modules as series include 1 image while study includes multiple images.

The optimization algorithm used by the system is referred to as parallel ordering for when the execution dependency graph is a directed acyclic graph with weighted vertices. The vertices of the graph represent analytics modules to be performed, and the edges represent constraints that one module must be performed before another. The weight of a vertex represents the estimated execution time for that module on a node in the cluster.

The parallel ordering algorithm has two stages. First, it creates a list of groups where in groups with more than one vertex, all the modules in the group can be executed in parallel, but the order of the overall list is kept. In the second stage, the stage 1 list is looped over and some modules are pushed to a later group if doing so does not locally increases the makespan.

The stage 1 algorithm is as follows.

```
LP ← Empty list that will contain the ordered groups
S ← Set of all vertices with no incoming edges
while S is non-empty do
    G ← Empty group
    remove all vertices v from S and add them to G
    add G to tail of LP
    for each vertex v with an edge e from a vertex in G to v do
        remove edge e from the graph
        if v has no other incoming edges then
            insert v into S
        end
    end
end
if graph has edges then
    return error (graph has at least one cycle)
else
    return LP
end
The stage 2 algorithm is as follows.
mark by |LP (i)| the largest weight of a vertex in LP (i). Then:
for i=1..length(LP) do
    if there is more than one node in LP
        for v in LP(i) ordered descending by vertex weight
            if no edges between v and the vertices in LP(i+1) then
                L'P ← LP where vertex v is moved from group i to group i+1
                if |L'P(i)|+|L'P(i+1)| <= |LP(i)|+|LP(i+1)| then
                    LP ← L'P
                    v ← the vertex with largest weight in LP(i)
                else
                    v ← null
                end
            end
        end
    end
end
```

The main process for conversion to an efficient big data application is described below. The method combines task parallelism for small data sets and data parallelism for large data sets. Given the weighted execution dependency graph, the number m of nodes in the cluster and the data size, the following method is used.

1. Create a parallel ordering LP. Let s be the maximum number of vertex in a group in LP. Also create a topological ordering LT.
2. Set the threshold to m/s, namely the number of nodes in the cluster divided by the maximum number of vertex in a group in LP.
3. If the number of keys in the data is greater than the threshold, create an execution plan by adding control steps to LT as follows.
    a. Add a P control step before the first analytics step in LT.
    b. Add a R control step before any vertex that processes by case_id.
    c. Add a M control step after any vertex that processes by case_id.
    d. Add a C control step after the last analytics step in LT.
Else, create an execution plan by adding control steps to LP as follows.
    a. Add a P control step before the first analytics step in LP.
    b. Add an R control step before any vertex that processes by case_id.
    c. Add an M control step after any vertex that processes by case_id.
    d. Add a D control step before any analytics step composed of a group with more than one vertex.
    e. Add an M control step after any analytics step composed of a group with more than one vertex.
    f. Add a C control step after the last analytics step in LP.
4. Create data partitions plan for each one of the control steps.
    a. For the P step, separate into m parts each data source such that the parts are uniform in size and preserve the data boundaries. For example if the data includes images, then the parts do not split images. If there is data referenced by some URI, take in account the size of the referenced data. If the number of keys in the data is small, you may have less than m partitions.
    b. For the D step, separate the data into partitions and module to execute, such that each part execution is uniform taking in account the estimated execution time for each module, the data size, the cluster configuration, and the reshuffle cost.
    c. For the M step, merge partitions such that each key appears in one partition only.
    d. For the R step, merge partitions such that each case_id appears in one partition only.
    e. For the C step, the various partitions are collected to one output data.

5. Translate the execution plan (from 3) and the data partitions plan (from 4) to an application in the specific big data processing platform. For example, the translation to SPARK will create an application that includes Resilient Distributed Dataset (RDD) and operations. The analytics steps will be translated to a mapValues( )operation. The P control step will be translated to mapToPair( ). The R, D and M control steps will be translated to use a special function that divides and merges the partitions according to estimated execution time, data size, cluster configuration, reshuffle cost. The C control step will be translated to collect( ).

Figure 3:
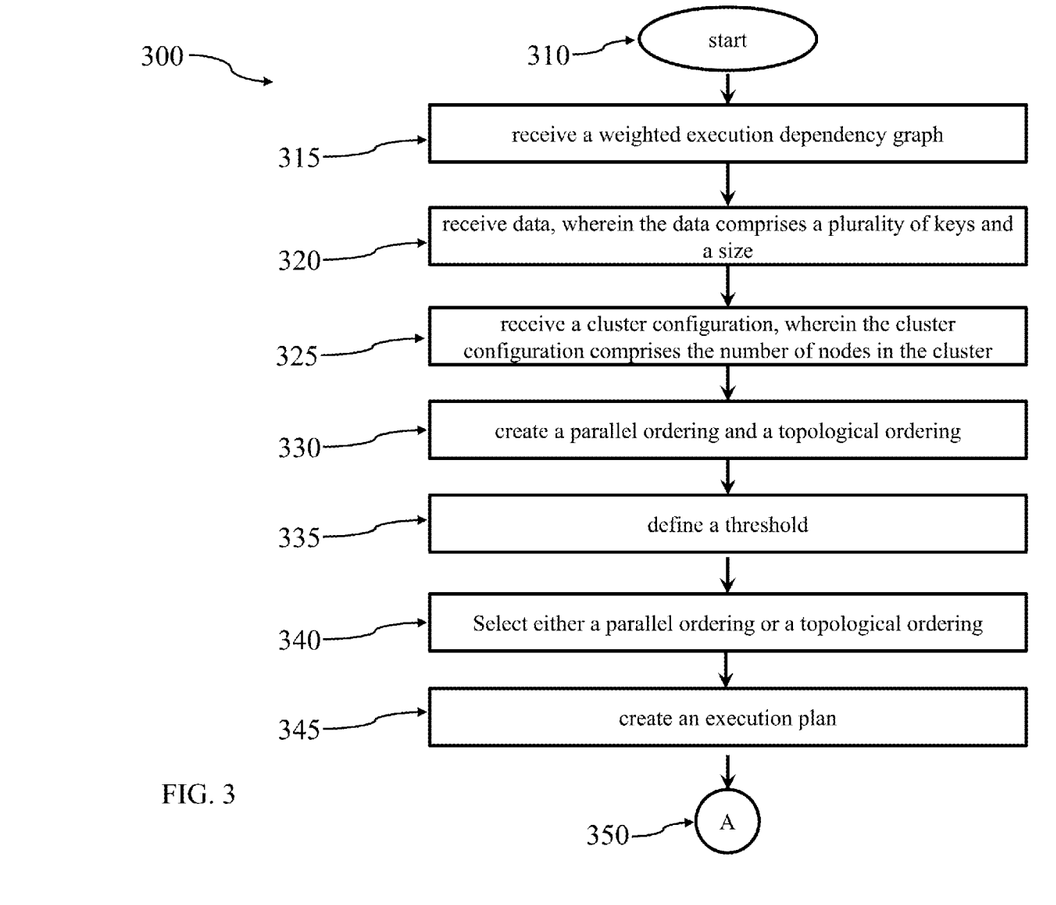
FIG. 3 shows a flow chart of a process, according to an embodiment of the present invention.
Figure 4:
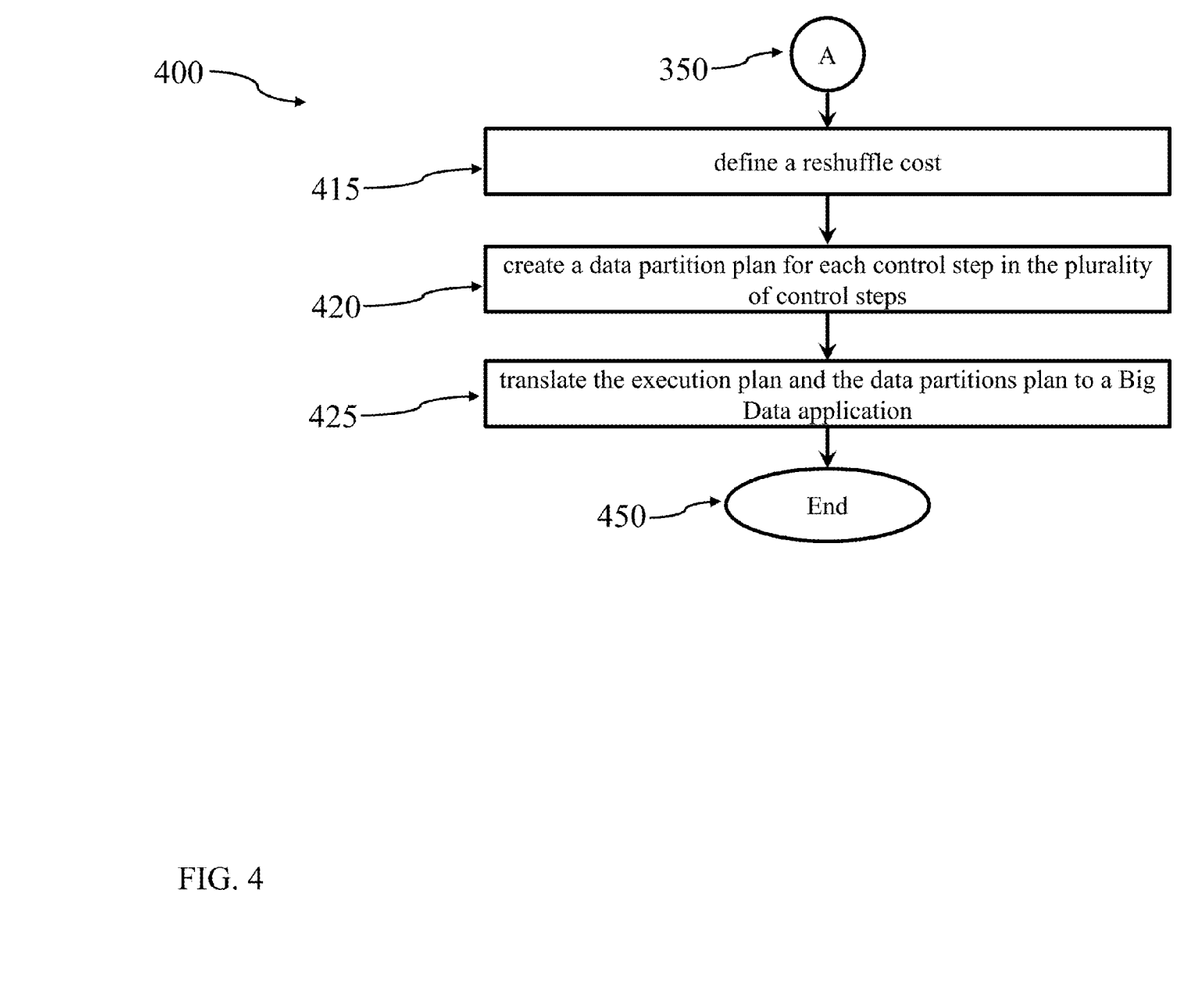
FIG. 4 shows a continuation of a flow chart of a process, according to an embodiment of the present invention.

FIG. 3 shows a flowchart 300 of the process, according to an embodiment of the present invention. In step 310, the process starts. In step 315, the system receives a weighted execution dependency graph. In step 320, the system receives data, wherein the data comprises a plurality of keys and a size. In step 325, the system receives a cluster configuration, wherein the cluster configuration comprises the number of nodes in the cluster. In step 330, the system creates a parallel ordering and a topological ordering. In step 335, the system defines a threshold. In step 340, the system selects either topological ordering or parallel ordering according to the threshold. In step 345, the system creates an execution plan. The process continues in step 350 into the flowchart 400 in FIG. 4. In step 415, the system defines a reshuffle cost. In step 420, the system, create a data partition plan for each control step in the plurality of control steps as described in the previous paragraph. In step 425, the system translates the execution plan and the data partitions plan to a big data application. In step 450, the process ends. The resulting application is able to perform multi modal analytics and utilize analytics modules written in various programming languages, such as Matlab, Java, or C. The system, in an embodiment, assumes that the application accumulates the results of previous modules, so that the results of all modules that preceded the current module are available for use by the current module. Additionally, the system assumes the application is mostly compute-intensive, as the analytics modules perform a substantial amount of computation on the same piece of data.

The modules of the execution dependency graph are homogeneous because their estimated execution times are the same in the various nodes in the cluster. This can happen for example if all nodes/machines in the cluster have the same hardware. For example, if the cluster has all nodes with similar CPUs, then the cluster is a homogeneous cluster. In a homogeneous cluster, the solution to the scheduling problem involves assigning each analytics module starts. However, there is no need to determine on which machine to execute a particular module as it executes the same amount of time on all machines in the cluster. That is, the problem is a combined data partition and task partition (scheduling) problem; however there is no task-to-machine mapping problem. Note, however, that not all modules have the same estimated time. One module can be 1 minute and another can be 10 minutes. But, the first module will be 1 minute in all machines in the cluster and the second 10 minutes in all machines in the cluster. The conversion engine receives as an input the pipeline descriptor. It also receives the data size and cluster configuration.

Figure 5:
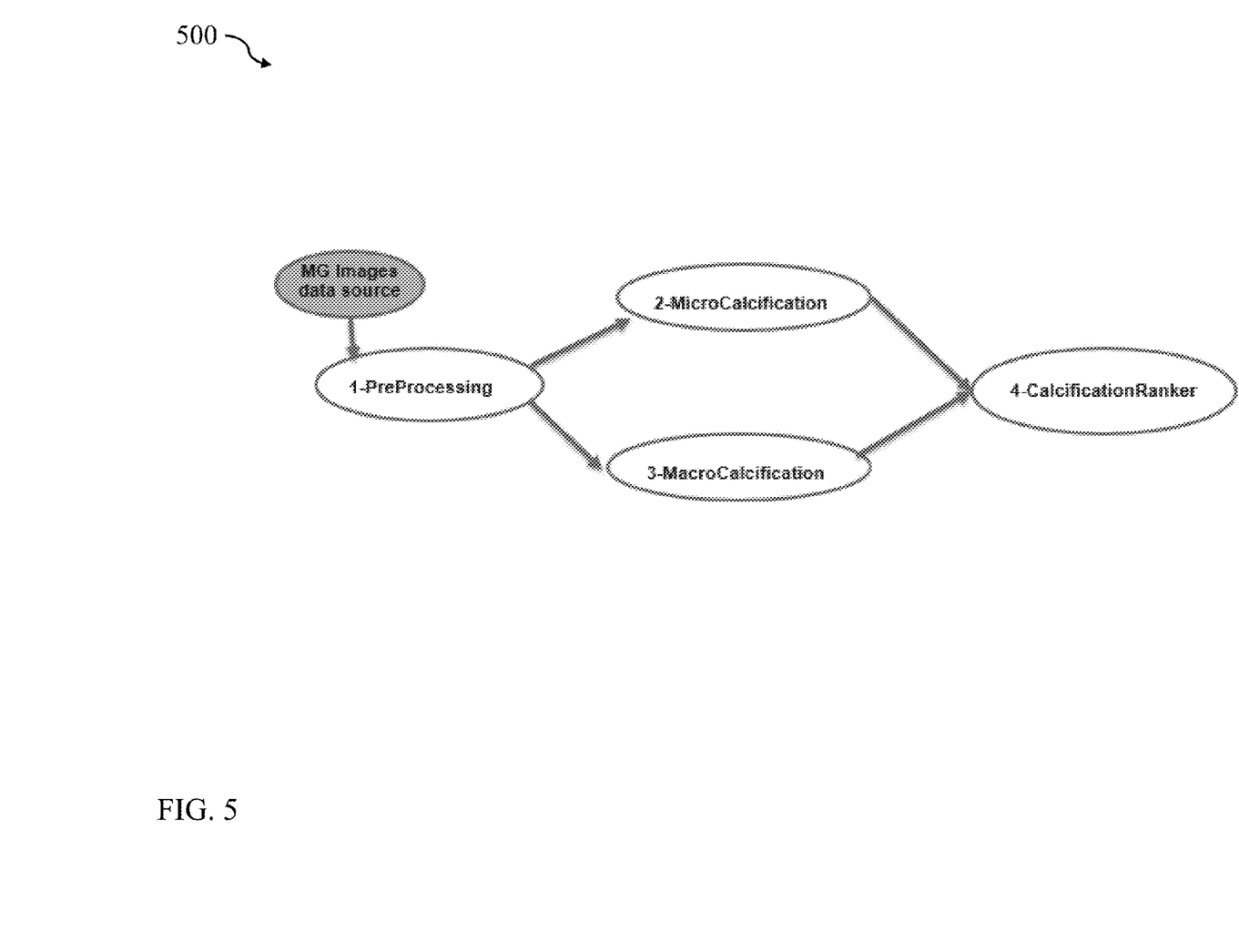
FIG. 5 illustrates an example execution dependency graph for Breast Mammogram (MG) Tumor pipeline, according to an embodiment of the present invention.

FIG. 5 illustrates an example execution dependency graph 500 for Breast Mammogram (MG) Tumor pipeline, according to an embodiment of the present invention. In this example, the cost of reshuffling is negligible, e.g. the application is compute-intensive or the platform has a shared file system. In an example application, the system was run on an MG image data source analysis problem. The MG images data source includes 1000 independent images in 1000 cases; each image is approximately the same size. The keys of the images are ordered 1 to 1000 and the case_id equals the key. The cluster includes 10 nodes in this example. The cost of reshuffling is assumed negligible. That is, the application is compute intensive or the file system is shared across nodes. The parallel ordering in this case is {1}, {2,3}, {4}. Since the number of keys (1000)>the threshold (10/2), topological ordering is used. The topological ordering is 1, 2, 3, 4. The execution plan is then P, 1, 2, 3, 4, C. The data partitions are as follows. In the P step, the system produces 10 partitions, each with 100 images/cases. In the C step, the system collects the results and returns them as the application output.

In a second example application, the system was run on the same dependence graph 500. The data includes 5 independent images in 5 cases, with each image of approximately the same size. The estimated execution time for modules 2 and 3 is 10 seconds each. The estimated execution time for all other modules is 1 second. The parallel ordering in this case is {1}, {2,3}, {4}. Since the number of keys (5)<=the threshold (10/2), parallel ordering is used. The execution plan is P, 1, D, {2,3}, M, 4, C. The data partitions are as follows. In the P step, the system divides each previous partition into two partitions on the same image such that one partition will perform module 2 and the other partition will perform module 3. After this step, there are 10 partitions in total. In the M step, each of the two partitions of the same image will be merged, resulting in 5 partitions. In the C step, the system collects all the results for all 5 images and returns it as the application output.

Figure 6:
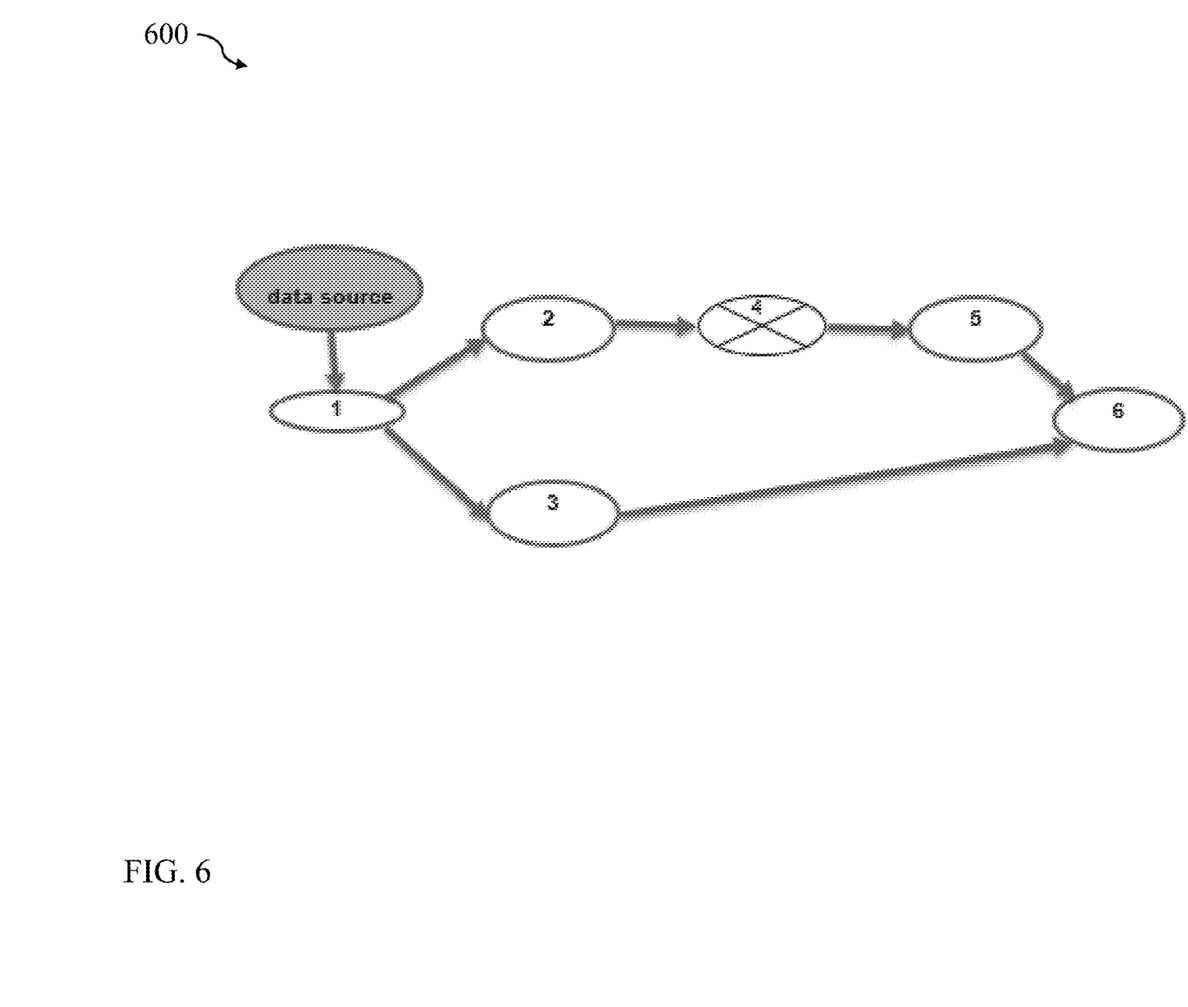
FIG. 6 illustrates a second example execution dependency graph, according to an embodiment of the present invention.

In a third example application, the system was run on the dependence graph 600 shown in FIG. 6. The data includes 5 images in 2 cases. The first case includes 3 of the 5 images. The second case includes 2 of the 5 images. The estimated execution time for modules 3 and 5 is 10 seconds each. The estimated execution time for all other modules is 1 second each. Furthermore, module 4 processes the data by case_id. The parallel ordering for stage I is {1}, {2,3}, {4}, {5}, {6}. The parallel ordering for stage II is {1}, {2}, {4}, {3,5}, {6}. Since the number of keys (5)<=the threshold (10/2), parallel ordering is used. The execution plan is P, 1, 2, R, 4, M, D, {3,5}, M, 6, C. The data partitions are similar to those in the previous example. Note that the makespan is 14 (1+1+1+ 10+1) seconds, whereas without the second stage in the parallel ordering, the makespan would be 23 (1+10+1+10+ 1).

Figure 7:
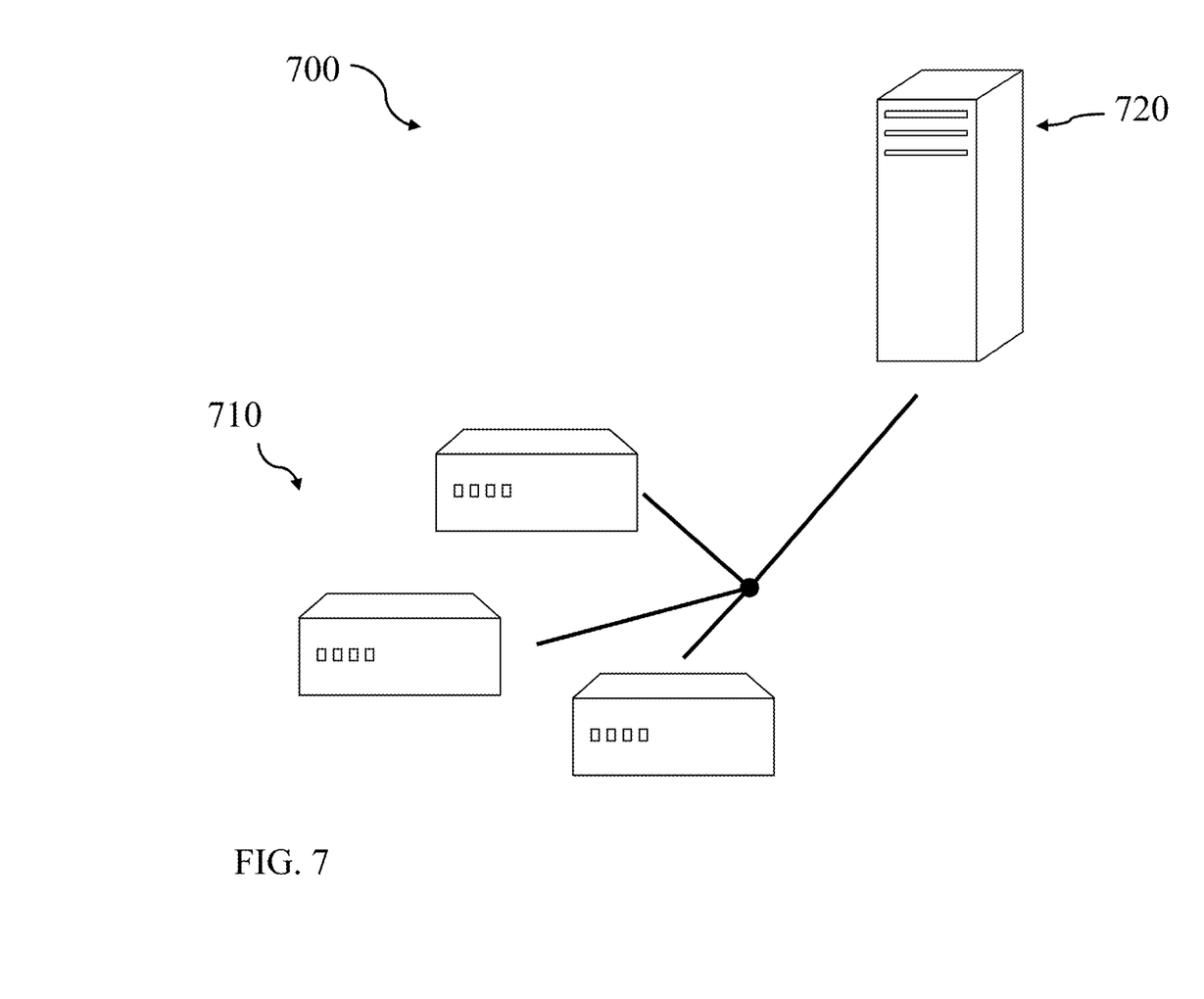
FIG. 7 illustrates a server and cluster node arrangement, according to an embodiment of the present invention.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. The computer program may reside, in part, on a server that is operatively connected to a cluster of cluster nodes. FIG. 7 shows an arrangement 700 of the system, with a server 720 and a computer cluster 710 connected by a computer network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or is operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks; and optical disks. The processor and the memory can be supplemented by, or incorporated in special purpose logic circuitry.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks. The computing system can include clients and servers.

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A system for application generation, the system comprising:
   a plurality of cluster nodes configured to execute an application;
   a server operatively connected to the plurality of cluster nodes and configured to:
      receive a homogeneous weighted execution dependency graph, a cluster configuration, a plurality of keys, and a data size;
      create a parallel ordering;
      define a threshold value;
      generate an execution plan, wherein the execution plan comprises a plurality of control steps;
      define a reshuffle cost;
      generate a data partition plan for each control step in the plurality of control steps; and
      translate the execution plan and the data partitions plan to a big data application.

2. The system of claim 1, wherein the server is further configured to transmit the application to the plurality of cluster nodes for execution.

3. The system of claim 1, wherein the homogeneous weighted execution dependency graph comprises interdependencies in data.

4. The system of claim 1, wherein the homogeneous weighted execution dependency graph comprises a pluarlity of modules having different execution times.

5. The system of claim 1, wherein the execution plan comprises a of control step selected from the group consisting of produce control step, divide control step, merge control step, and remerge control step.

6. The system of claim 1, wherein the server is further configured to:
   determine if the number of keys is greater than the threshold, and if the number of keys is greater than the threshold, adding the plurality of control steps to the execution plan using topological ordering; and
   determine if the number of keys is less than or equal to the threshold, and if the number of keys is less than or equal to the threshold, adding the plurality of control steps to the execution plan using parallel ordering.

7. The system of claim 1, wherein generating the data partition plan takes into account the size of the data, the cluster configuration, and the reshuffle cost.

8. The system of claim 1, wherein the application comprises data partitions and operations.

9. The system of claim 1, wherein the application comprises an Unstructured Information Management Architecture Asynchronous Scaleout application.

10. The system of claim 1, wherein the application comprises a SPARK application.

11. A method for generating an application comprising:
   receiving a homogeneous weighted execution dependency graph, a plurality of keys, and a size from a computer interface;

receiving a cluster configuration, wherein the cluster configuration comprises the number of nodes in the cluster;

creating a parallel ordering;

defining a threshold;

generating an execution plan, wherein the execution plan comprises a plurality of control steps;

defining a reshuffle cost;

generate a data partition plan for each control step in the plurality of control steps;

translating the execution plan and the data partitions plan to a big data application; and transmitting the application to a plurality of cluster nodes for execution.

12. The method of claim 11, wherein translating comprises generating a mapValues( ) operation.

13. The method of claim 11, wherein generating the execution plan comprises:

determining if the number of keys is greater than the threshold, and if the number of keys is greater than the threshold, adding the plurality of control steps to the execution plan using topological ordering; and determining if the number of keys is less than or equal to the threshold, and if the number of keys is less than or equal to the threshold, adding the plurality of control steps to the execution plan using parallel ordering.

14. The method of claim 11, wherein creating the data partition plan takes into account the size of the data, the cluster configuration, and the reshuffle cost.

15. The method of claim 11, wherein the application comprises data partitions and operations.

16. The method of claim 15, wherein the application comprises an Unstructured Information Management Architecture Asynchronous Scaleout application.

17. The method of claim 15, wherein the application comprises a SPARK application.

18. The method of claim 11, further comprising translating a set of analytics steps into a mapValues( ) operation.

19. The method of claim 11, further comprising the step of performing a collect( ) operation.

20. A method for generating big data applications comprising:

receiving a weighted execution dependency graph;

receiving data, wherein the data comprises a plurality of keys and a size;

receiving a cluster configuration, wherein the cluster configuration comprises the number of nodes in the cluster;

creating a parallel ordering;

defining a threshold;

generating an execution plan, wherein generating the execution plan comprises:

determining if the number of keys is greater than the threshold, and if the number of keys is greater than the threshold, adding a first plurality of control steps to the execution plan using topological ordering; and determining if the number of keys is less than or equal to the threshold, and if the number of keys is less than or equal to the threshold, adding a second plurality of control steps to the execution plan using parallel ordering;

defining a reshuffle cost;

generating a data partition plan for each control step in the plurality of control steps, wherein generating the data partition plan takes into account the estimated execution time, the size of the data, the cluster configuration, and the reshuffle cost;

translating the execution plan and the data partitions plan to a Big Data application.

\* \* \* \* \*